United States Patent
Nordmark et al.

(10) Patent No.: US 8,964,594 B2
(45) Date of Patent: *Feb. 24, 2015

(54) NETWORK PROCESSOR UNIT AND A METHOD FOR A NETWORK PROCESSOR UNIT

(71) Applicant: Marvell International Ltd., Hamilton (BM)

(72) Inventors: Gunnar Nordmark, Stockholm (SE); Thomas Bodén, Strängnäs (SE); Jakob Carlström, Uppsala (SE); Vitaly Sukonik, Katzir (IL); Mattias Persson, Bromma (SE)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,029

(22) Filed: Jan. 7, 2014

(65) Prior Publication Data
US 2014/0146827 A1    May 29, 2014

Related U.S. Application Data

(63) Continuation of application No. 12/994,951, filed as application No. PCT/EP2009/056592 on Nov. 29, 2010, now Pat. No. 8,630,199.

(60) Provisional application No. 61/057,614, filed on May 30, 2008.

(30) Foreign Application Priority Data

May 30, 2008    (SE) ...................................... 0801280

(51) Int. Cl.
| | |
|---|---|
| *H04L 12/26* | (2006.01) |
| *H04L 12/933* | (2013.01) |
| *H04L 12/863* | (2013.01) |
| *H04L 12/861* | (2013.01) |
| *H04L 12/935* | (2013.01) |

(52) U.S. Cl.
CPC .............. *H04L 49/15* (2013.01); *H04L 49/101* (2013.01); *H04L 49/103* (2013.01); *H04L 47/625* (2013.01); *H04L 49/9036* (2013.01); *H04L 49/30* (2013.01)
USPC ......................................................... 370/252

(58) Field of Classification Search
None
See application file for complete search history.

(56) References Cited

U.S. PATENT DOCUMENTS

| | | |
|---|---|---|
| 7,826,470 B1 | 11/2010 | Aloni et al. |
| 8,411,574 B2 | 4/2013 | Liu et al. |

(Continued)

FOREIGN PATENT DOCUMENTS

| | | |
|---|---|---|
| EP | 1 345 362 A2 | 9/2003 |
| TW | 200922221 A | 5/2009 |
| WO | WO 02/39667 A2 | 5/2002 |

*Primary Examiner* — Chi H Pham
*Assistant Examiner* — Fahmida Chowdhury

(57) ABSTRACT

A method of and a network processor unit for processing of packets in a network, the network processor comprising: communication interface configured to receive and transmit packets; at least one processing means for processing packets or parts thereof; an embedded switch configured to switch packets between the communication interface and the processing means; and wherein the embedded switch is configured to analyze a received packet and to determine whether the packet should be dropped or not; if the packet should not be dropped, the switch is configured to store the received packet, to send a first part of the packet to the processing means for processing thereof, to receive the processed first part of the packet from the processing means, and to transmit the processed first part of the packet.

20 Claims, 7 Drawing Sheets

(56) References Cited

U.S. PATENT DOCUMENTS

| | | | |
|---|---|---|---|
| 2002/0080789 A1* | 6/2002 | Henderson et al. | 370/392 |
| 2004/0151197 A1* | 8/2004 | Hui | 370/412 |
| 2006/0248376 A1* | 11/2006 | Tezcan et al. | 714/4 |
| 2007/0230475 A1* | 10/2007 | Langner | 370/394 |
| 2008/0310307 A1 | 12/2008 | Yeom | |

* cited by examiner

NETWORK PROCESSOR UNIT AND A METHOD FOR A NETWORK PROCESSOR UNIT

INCORPORATION BY REFERENCE

This application is a continuation of U.S. application Ser. No. 12/994,951, filed on Nov. 29, 2010, now, issued as U.S. Pat. No. 8,630,199, which is a National Stage Application based on PCT/EP2009/056592, filed on May 29, 2009, which claims the benefit of U.S. Provisional Application No. 61/057,614, filed on May 30, 2008. The disclosures of the applications referenced above are incorporated herein by reference in their entireties.

TECHNICAL FIELD

The present invention relates to a method of and a network processor unit for processing packets in a network, and especially to a method of and a network processor unit with an embedded packet switch.

BACKGROUND

A network processor may be used as a single-chip switch/router or on an ingress or egress line card in a modular switch/router. Many prior art network processors comprise several intermediate buffers that are used between different modules of the network processor, causing the network processor to have more buffer space than needed. Further, the several intermediate buffers may cause latency during processing.

Figure 1:
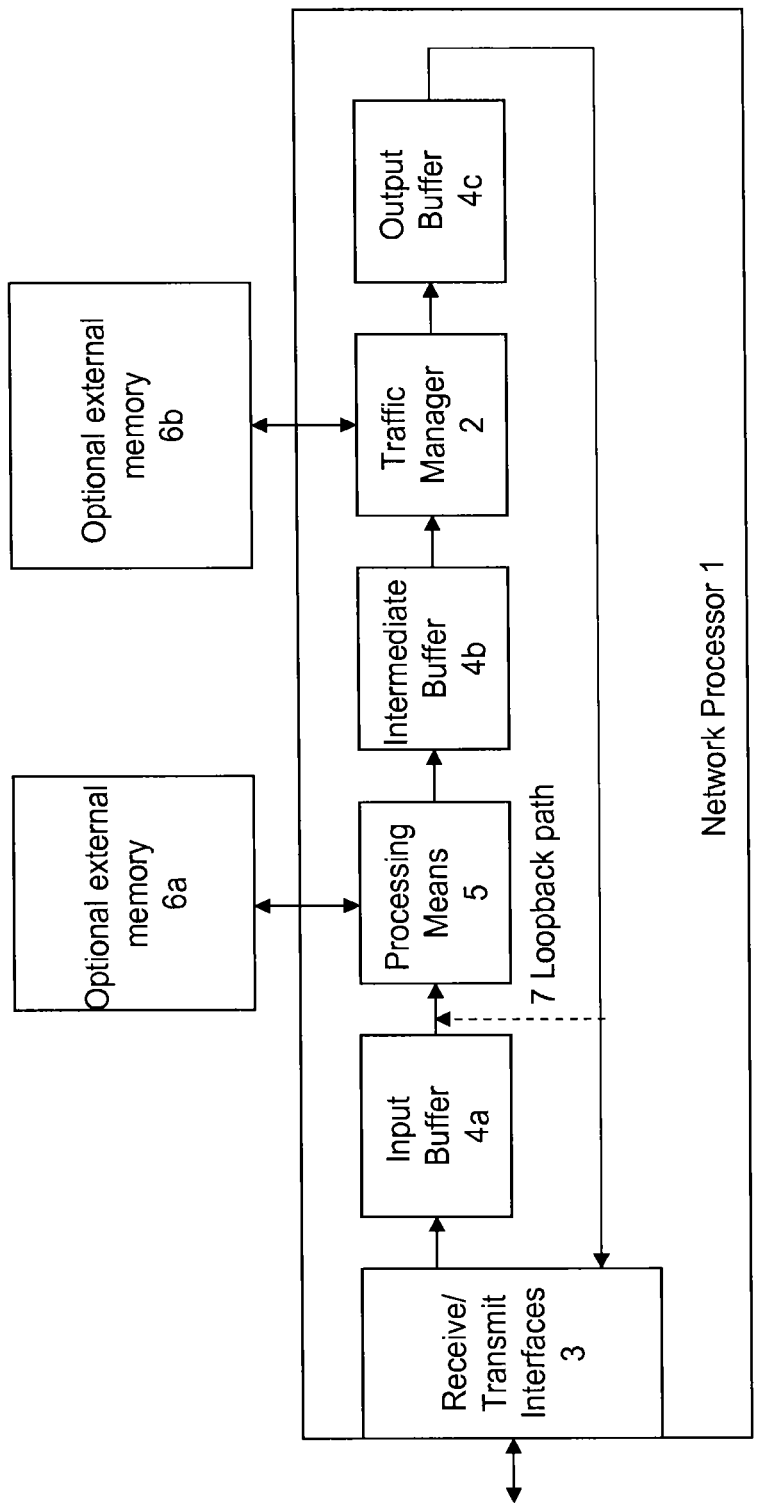

FIG. 1 schematically shows a prior art network processor 1 having several intermediate buffers. As illustrated, the network processor 1 comprises a traffic manager 2, interfaces 3, buffers 4a, 4b, 4c, with queues and schedulers, processing means 5, and optional external memories 6a, 6b, cf. FIG. 1. Packet data received from the interfaces 3 are buffered in an input buffer 4a, processed by the processing means 5, buffered in an intermediate buffer 4b before being written to the buffers of the traffic manager 2. From the traffic manager 2, the packet data is scheduled and transmitted on the interfaces 3 via an output buffer 4c. Due to varying requirements between different systems, the ideal sequence of packet processing varies. For example, all or part of the traffic leaving the traffic manager may require an additional pass through the processing means before transmission as illustrated by a loopback path 7. In other cases, two passes through the traffic manager may be required.

A drawback with the prior art network processor 1 is the large required buffer size, which is larger than needed. If for example, a burst of packet data passes through the network processor 1 of FIG. 1, it is first stored in the input buffer 4a, later in the intermediate buffer 4b and last in the output buffer 4c. This means that each of the buffers; input buffer, the intermediate buffer and the output buffer, must provide buffer space for a normal amount of packet data and for the burst size.

Another drawback with the prior art network processor is the sequential flow of packets through the network processor. As illustrated in FIG. 1, firstly, the packets are received on the interface; secondly, they are buffered in the input buffer; thirdly, they are processed by the processing means; fourthly, they are buffered in the intermediate buffer; fifthly, they are written to the buffers of the traffic manager; and sixthly, they are buffered in an output buffer; and seventhly, they are transmitted on the interfaces.

U.S. 2005/0169259 to Su et al discloses a packet switching unit comprising ports, a packet switching control unit, a microprocessor data transfer interface, a microprocessor, and a packet buffer. The packet buffer comprises a packet area, an index buffer and a transfer queue circuitry. Both the packet switching control unit and the microprocessor data transfer interface can transfer packet from/to the ports and the microprocessor, respectively.

A drawback with the packet switching unit to Su et al is that it also requires large buffer space, since the ports have a store-and-forward functionality implying that the packets are stored by the ports before they are moved into the packet buffer.

U.S. 2007/0230475 to Langner discloses a switch-based network processor comprising input interfaces, output interfaces, processing elements, and a switch with bidirectional ports. The network processor associates information with a packet received via an input interface, and this information is sequentially processed through multiple ones of the processing elements in serial order based on switching operations of the switch. The network processor may be viewed as providing selectable interconnection between inputs and outputs of the various processing elements dependent on the application. For a certain application, packets will therefore flow only to the particular processing elements that are needed and in the appropriate order. The sequence of processing elements is obtained by configuration of the switch and of the processing elements.

A drawback with the network processor to Langner is the predetermined serial order of packet switching for a given application such as a secure transaction server application, a secure sockets layer (SSL) VPN firewall application or a secure Internet protocol (IPSEC) VPN firewall application. After configuration for a specific application, all packets will have the same serial processing order and thus will take the same path through the network processor.

SUMMARY

It's an aim of the present invention to overcome the drawbacks and disadvantages of the prior art. More specifically, it is an aim of the present invention to minimize the size of the buffers in a network processor and to provide flexible paths for packets through the network processor in order to adapt to differing system requirements.

The above mentioned aim among others is fulfilled with a method and a network processor unit according to the independent claims. Further embodiments of the invention are specified in the dependent claims.

DETAILED DESCRIPTION OF DRAWINGS

Figure 2:
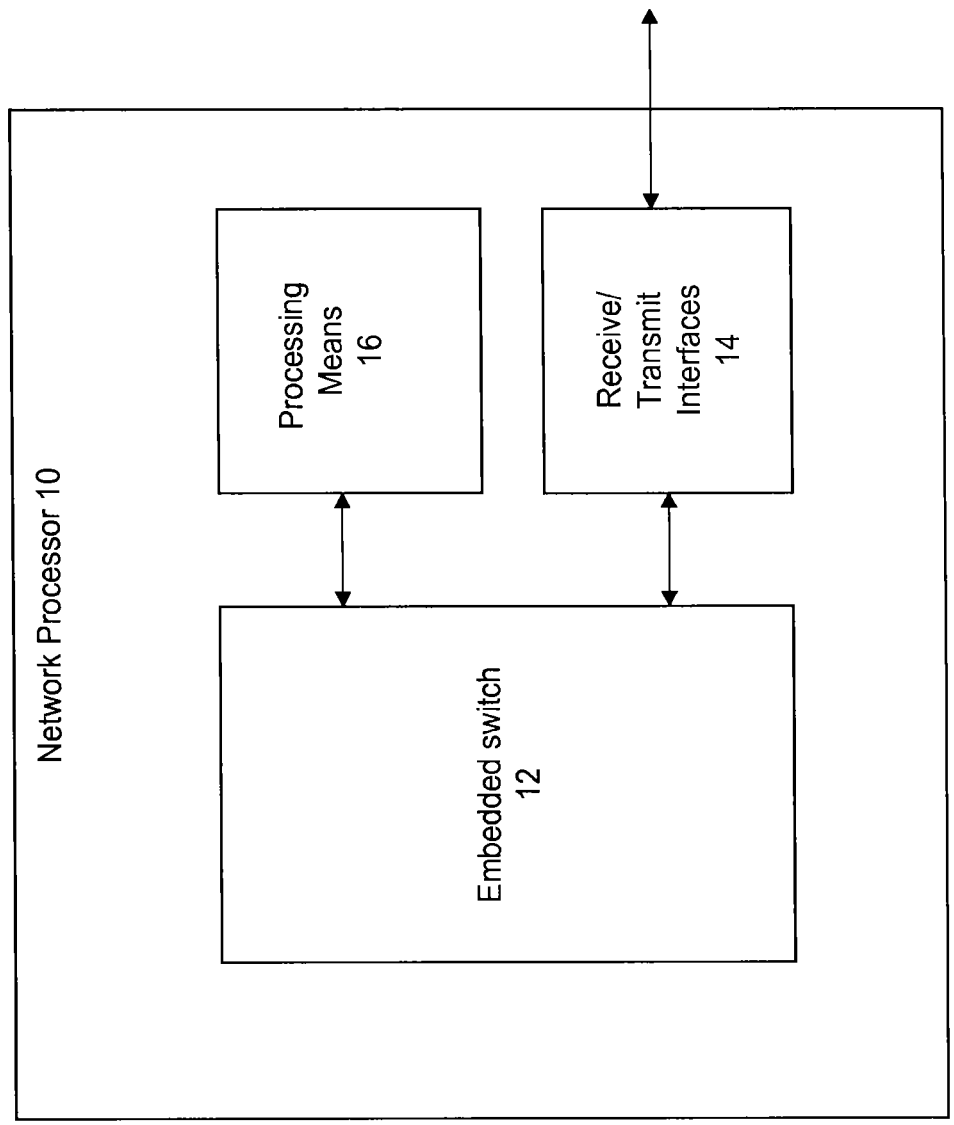
Figure 3:
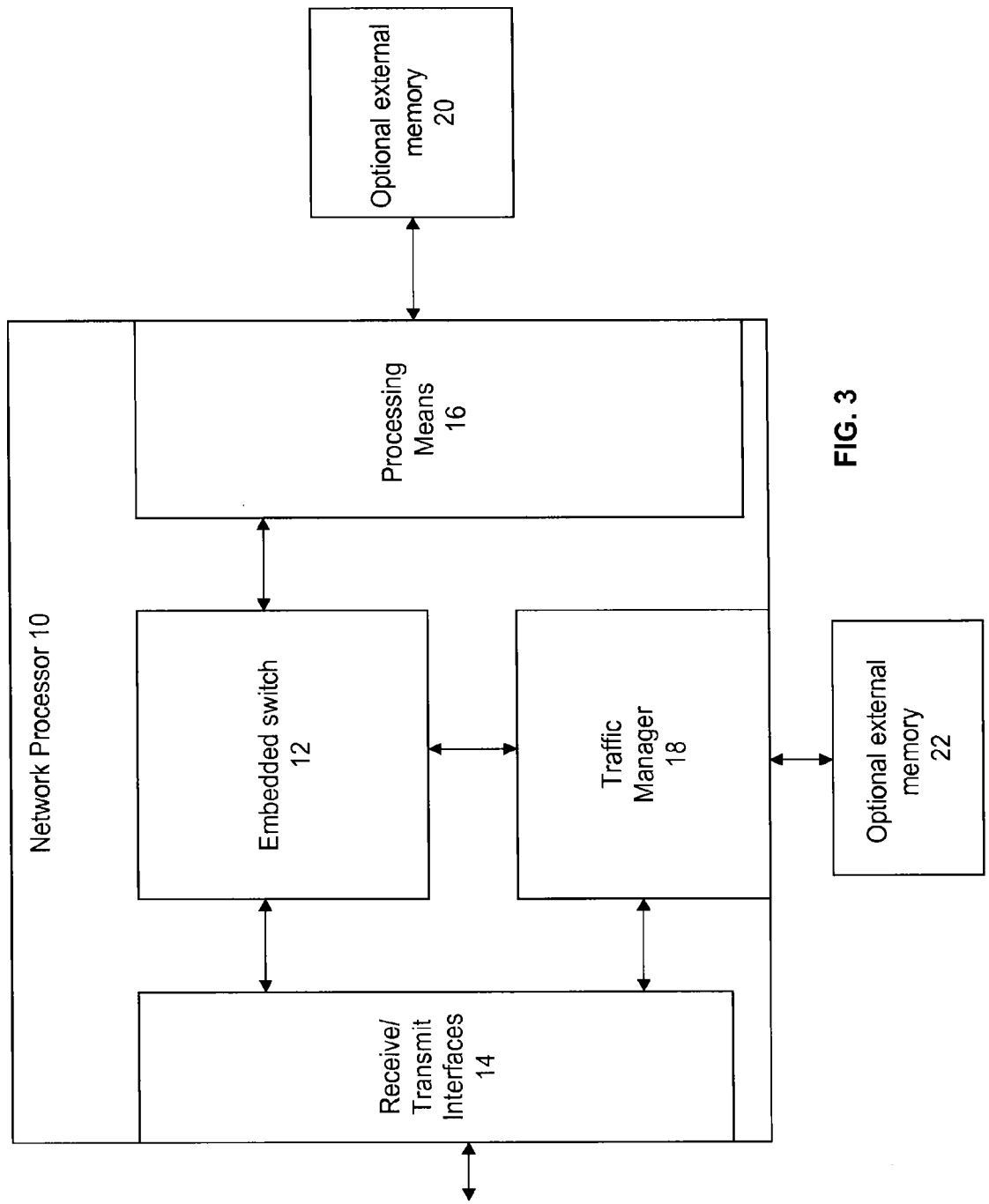
Figure 4A:
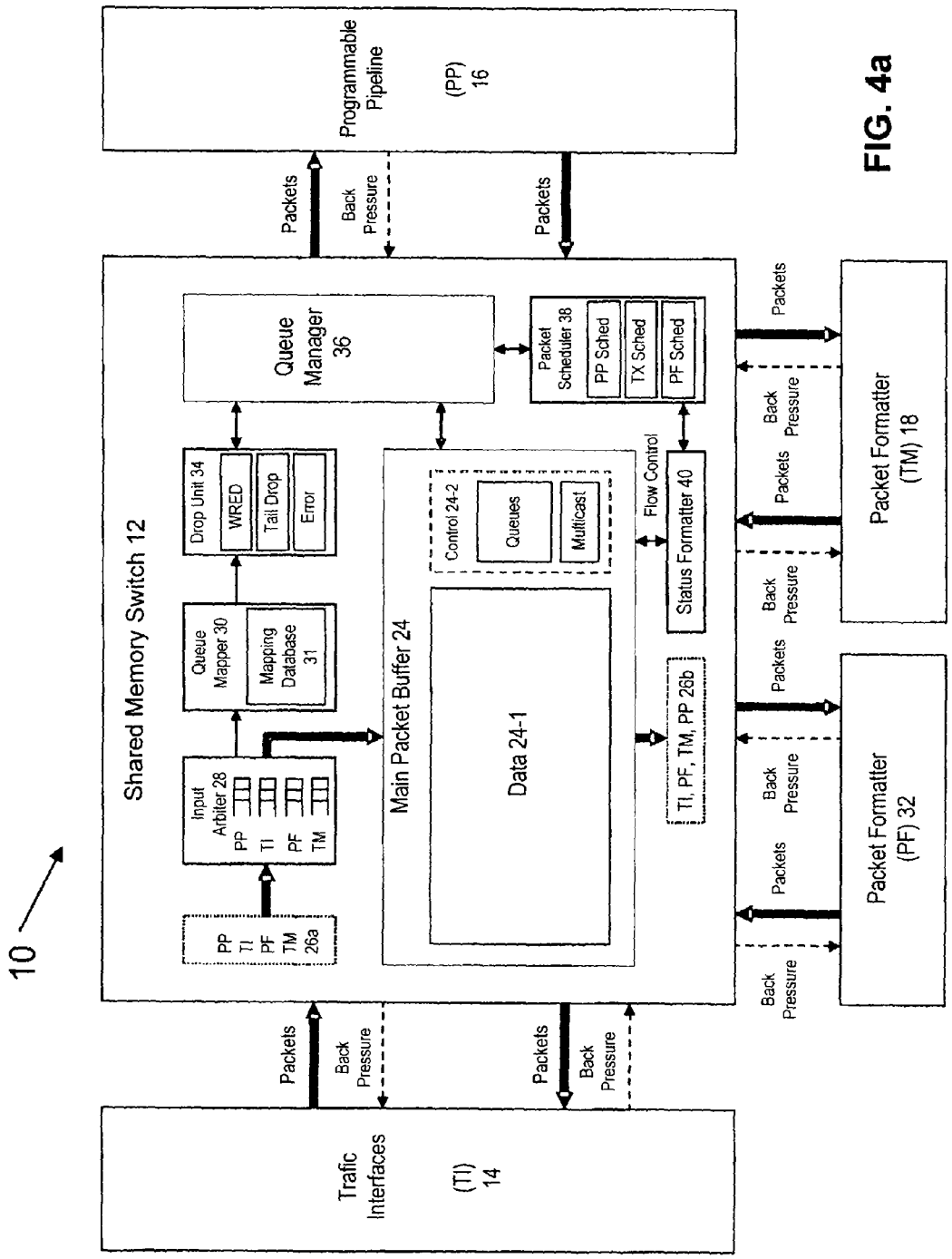
Figure 4B:
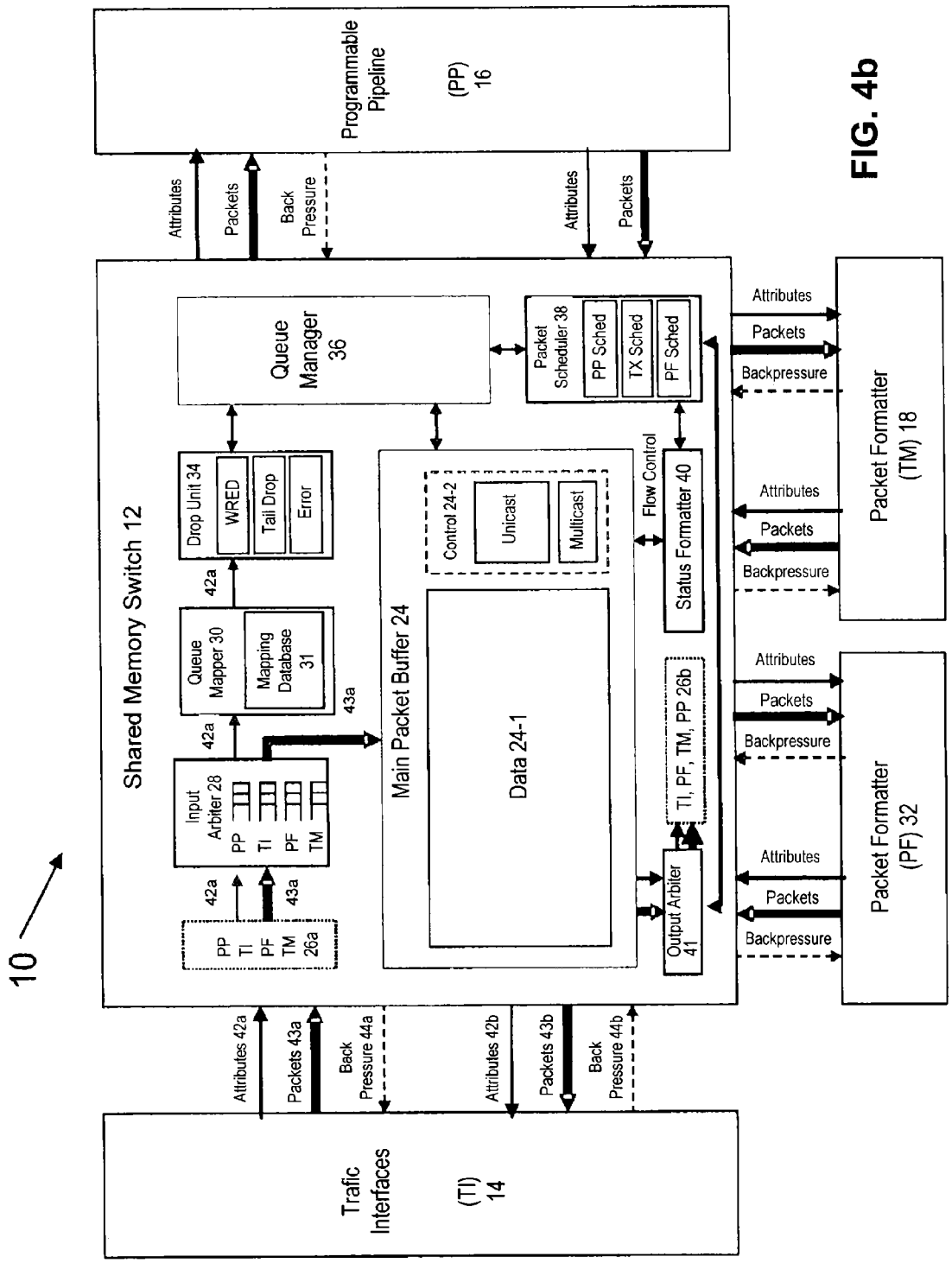
Figure 5A:
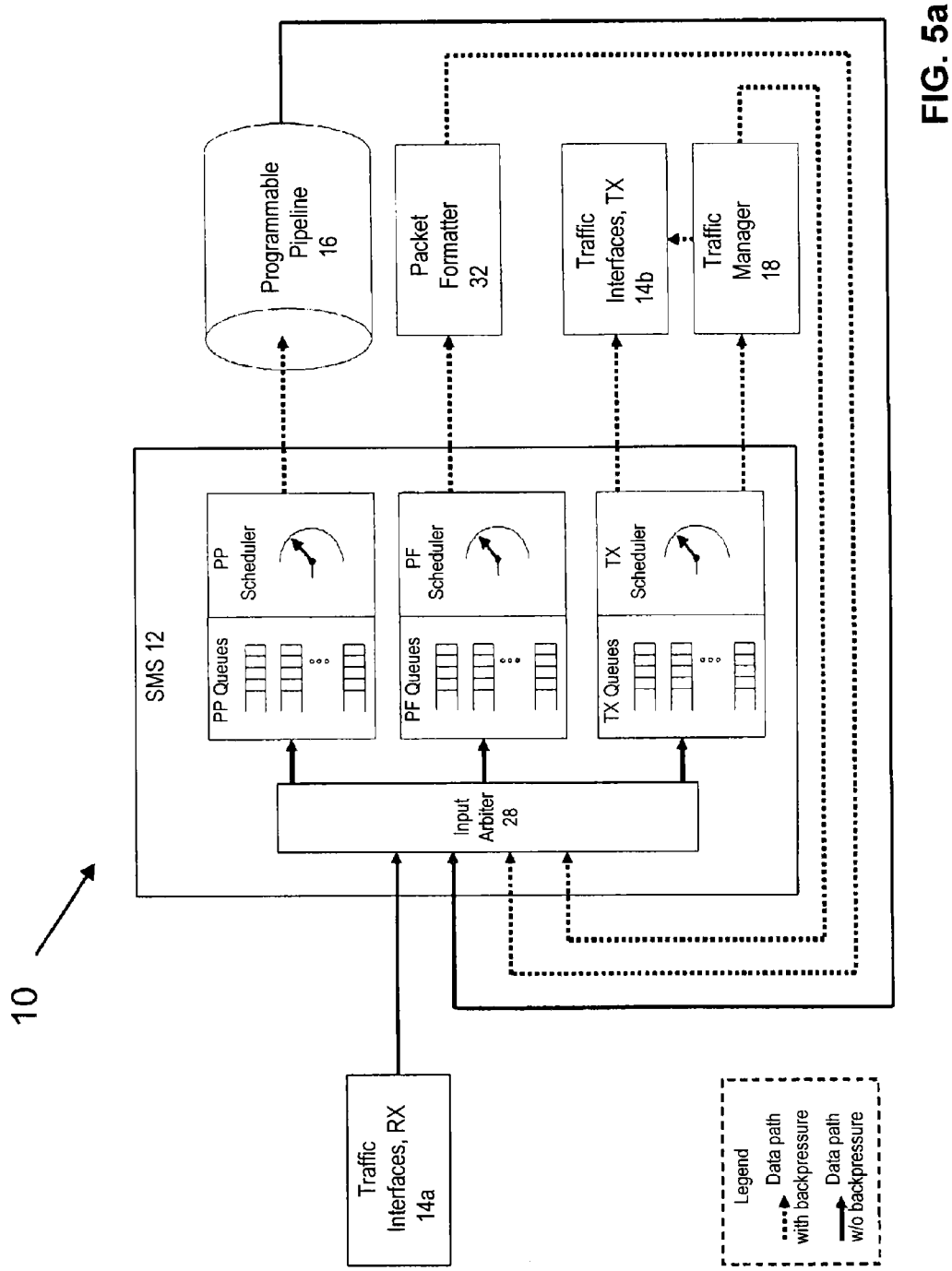
Figure 5B:
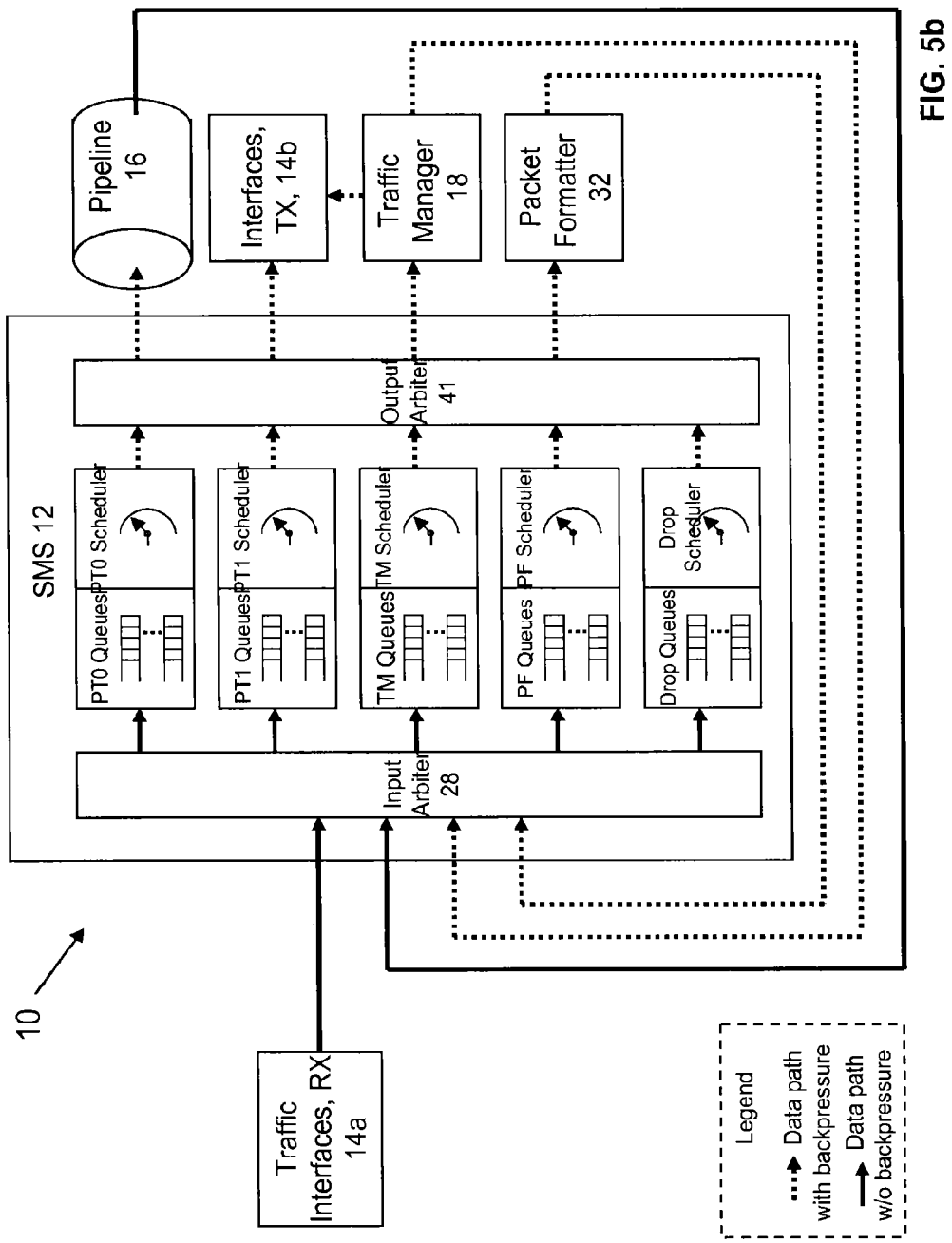

Embodiments of the present invention will be described in more detail with reference to the following drawings, in which:

FIG. 1 schematically illustrates a block diagram of a prior art network processor;

FIG. 2 schematically illustrates a block diagram of a network processor according to an embodiment of the present invention;

FIG. 3 schematically illustrates a block diagram of a network processor according to an embodiment of the present invention;

FIG. 4a schematically illustrates a block diagram of an embodiment of a network processor according to the present invention;

FIG. 4b schematically illustrates a block diagram of an embodiment of a network processor according to the present invention;

FIG. 5a schematically illustrates block diagram of an embodiment of a network processor according to the present invention, wherein a scheduling view of an embedded switch is shown, and FIG. 5b schematically illustrates block diagram of an embodiment of a network processor according to the present invention, wherein a scheduling view of an embedded switch is shown.

DETAILED DESCRIPTION OF EMBODIMENTS OF THE INVENTIONS

The present invention will now be described in more detail with reference to the accompanying drawings, in which drawings same reference numerals indicate the same or corresponding features, components or means.

According to the present invention, the input buffer, the intermediate buffer and the output buffer comprised in the prior art network processor shown in FIG. 1 are replaced by an embedded switch. In accordance with the present invention, a functional block, e.g. traffic interfaces, e.g. ports, processing means, traffic manager, packet formatter or another component communicating with and writing packet data to the embedded switch, is configured to select the output address of the packet data. In embodiments, the embedded switch comprises a buffer memory that is shared between queues toward different modules, e.g. functional blocks, of the network processor, such as toward a processing means, one or more interfaces and a possible traffic manager, whereby the required total buffer size is reduced.

Thus, according to the present invention, the same packet burst only occurs at most once at a time in the embedded switch. Further, the addressing mechanism of the present invention, whereby the functional block writing packet data to the embedded switch selects output address, e.g. output port, enables flexible organization of data paths through the modules of the network processor, e.g. through the processing means and a traffic manager. Furthermore, by means of the present invention it is possible to switch packets from the receive interfaces directly to the transmit interfaces based on attributes set, the attributes can be based on information received with the packets, e.g. in the packet headers. Further, the uniform communication interface and the flexible addressing of the present invention enable different subsystems, e.g. processing means, to be connected to different ports of the embedded switch.

It should be understood that the term packet when used in this application document may refer to various types of data units, including but not limited to Internet Protocol version 4 (IPv4) packets, Internet Protocol version 6 (IPv6) packets, IEEE 802.3 frame, Point-to-Point Protocol (PPP) frame, ATM cell, or other protocol data units (PDU). Further, a packet may be a part of such a PDU, e.g. cell, segment or memory page; a control message; or another type of data unit which is intercommunicated in a network processing system.

FIG. 2 schematically illustrates a network processor 10, sometimes also referred to as a network processing unit, according to an embodiment of the present invention. The network processor 10 comprises a switch 12, a communication interface 14 and a processing means 16. The switch 12 is arranged in communication with the interface 14 and the processing means 16.

FIG. 3 schematically illustrates an embodiment of a network processor 10 further comprising a traffic manager 18 arranged in communication with the switch 12 and with the communication interfaces 14. Optional external memories 20, 22 may be arranged in communication with the processing means 16 and the traffic manager 18, respectively.

The network processor can be any of a variety of known types; including the processor described in the international patent application no. PCT/EP2007/055777 which is incorporated herein by reference, but it may also be a cryptographic processor, a string-search processor, and/or a general-purpose CPU. The processor may comprise processing means of a variety of known types; including a synchronous processing pipeline, as described in the international patent application no. PCT/SE2005/001969 which is incorporated herein by reference. Further, the processor may comprise processing means such as a packet formatter, and/or a traffic manager.

The switch 12 is configured to provide traffic management functionality, including class-of-service separation, hierarchical scheduling, traffic shaping, and spatial and logical multicast.

Further, the switch 12, preferably an embedded switch, herein also referred to as a shared memory switch (SMS), is configured to switch packets between the communication interface, e.g. between one of the receiving/transmitting interfaces 14, and the processing means 16. In embodiments, the switching is preferably based on information, e.g. set attributes, received with the packets. Furthermore, the switch 12 is adapted to exchange packet data at a data rate matching the system requirement on the data path, i.e. matching the wire speed.

FIGS. 4a, 4b schematically illustrates embodiments of a network processor 10, wherein the switch 12 comprises a packet buffer 24, input ports (sometimes also called write ports) 26a, output ports (sometimes also called read ports) 26b, an input arbiter 28, a queue mapper 30, a drop unit 34, a queue manager 36, and a packet scheduler 38. As illustrated in FIG. 4, embodiments of the network processor 10 may also comprise a packet formatter 32 arranged in communication with the switch 12.

In embodiments, the switch 12 is configured to accomplish the switching of packets using a buffer in an embedded memory of the switch 12, cf. FIGS. 4a, 4b. The buffer may for example be an embedded buffer such as a packet buffer 24.

As exemplary illustrated in FIGS. 4a, 4b, the packet buffer 24, sometimes also called the main packet buffer, comprises a data storage 24-1 for storage of packet data and a control unit 24-2 comprising logic and control memory for implementing queues and means for multicast and/or unicast. The control memory is configured to store linked list elements comprising e.g. pointers to packet data, pointers to other linked list elements and packet attributes such as packet type and packet length. The packet buffer 24 of the shared memory switch 12 can be read or written using one or more of a multiple ports 26 (26a,26b); a processing means port e.g. a programmable pipeline port (PP port), a traffic interface port (TI port), an optional packet formatter port (PF port), and/or an optional traffic manager port (TM port).

The PP, TI, PF, TM ports 26 may comprise one or more subports, i.e. one or more logical addresses within the port. The subports may be throttled by backpressure from the receiving subsystem, e.g. from the processing means 16, the traffic manager 18 and/or the packet formatter 32. For example, a TI subport corresponding to a TX Ethernet MAC may throttle a node mapped to this subport in the scheduler for queues toward the traffic interfaces 14. The PP read port may have 16 subports corresponding to traffic interfaces. The TI read port may have 64 subports corresponding to traffic interfaces. The TM read port may have a single subport. The PF read port may have 2 subports. Packets with different subports may be interleaved when they are read or written over a port 26; i.e. a first part of a first packet belonging to a first subport may be read or written over a port followed by a first part of a second packet before a second part of the first packet is read or written over the port.

The packet buffer 24 may be configured to operate in a store-forward manner, i.e. the packet buffer 24 is configured to store a complete incoming packet before it is sent out, so that the memory switch 12 can validate packet integrity of received packets and drop error-marked packets. Further, in embodiments, the packet buffer 24 is configured to store 4 MB of packet data and to absorb up to 32K packets. It may support a packet write rate and a packet read rate of 400 MHz. In another embodiment it may support a packet write rate of 800 MHz and a packet read rate of 400 MHz. However, it should be understood that the packet write rate and the packet read rate may be varied and may be another suitable write rate and read rate, respectively. The packet buffer 24 may further comprise the 64 multicast queues which can hold 64 packets each.

In embodiments, the switch 12 is configured not to modify packet alignment, i.e. not to modify the packet or the data comprised in the packet. Further, to reserve space for additional headers for packets received by the network processor 10, the traffic interfaces 14 should preferably be configured to shift the packet offset, e.g. by adding a packet offset value PBase. The traffic interface 14 may also strip excess header space off the packets from the switch 12 before transmission to e.g. a connected unit. Other processing means configured to receive and transmit complete packets may also shift the packet offset. These processing means comprise e.g. the traffic manager, the packet formatter, cryptographic processing units or string search processing units.

In embodiments, when a packet is read from a queue for insertion into the processing means 16, the first 256 bytes are sent into the processing means 16. If the sum of the packet length PLen and the packet offset value PBase is 256 bytes or less, the entire packet goes into the processing means 16. If the packet is longer, i.e. if the sum of PLen and PBase is more than 256 bytes, the tail of the packet is kept in a dedicated area of the packet buffer 24, e.g. in the data storage 24-1, and reconnected with the packet head when the packet head exits from the processing means 16. However, in another embodiment, the entire packet is sent to the processing means 16 irrespective of the packet length. Further, the processing means 16 may be configured to process parts of a packet, entire packets and a combination thereof. It should also be understood that the packets or parts thereof received by the switch may be interleaved.

In embodiments, if received packets have varying lengths, the packet rate is higher if packets are short; e.g. between 64 bytes and 256 bytes, inclusive, than if packets are long; e.g. greater than 256 bytes. In embodiments where only a first part of long packets are sent into the processing means 16, the capacity of the processing means 16 can be oversubscribed; i.e. be lower than required to process packets at the maximum packet rate for short packets. If the processing means 16 is oversubscribed the embedded switch 12 may store temporary bursts of short packets. If the extent of these bursts is limited and the capacity of the processing means 16 is greater than the average packet rate all received packets may still be processed by the processing means 16 because the processing means 16 may catch up and process previously stored bursts during periods with long packets.

In embodiments wherein the heads of long packets are sent to the processing means 16 and the processing means 16 behaves like a synchronous pipeline adapted to process short packets at a guaranteed packet rate of 150 MHz or another suitable packet rate, there may be unused processing capacity if packets are long, because the packet rate for long packets may be less than the guaranteed packet rate, causing time slots where packets could be inserted into the synchronous pipeline to be left unused. In such embodiments packet heads exiting from the processing means 16 may be stored in the embedded switch 12 and reenter the processing means 16 for further processing, utilizing the otherwise unused processing capacity. After completion of processing the packet heads exit from the processing means 16 and reconnect with the packet tails in the embedded switch 12. Such extended processing is useful e.g. if a subset of the set of packets need more processing than other packets, for example because they require additional protocol headers to be added.

The switch 12 is configured to support unicast, logical multicast and/or spatial multicast. Packet type and additional input parameters are passed as packet attributes with the packet into the write port as described below.

In embodiments, the embedded switch 12 comprises means for logical multicast, whereby the embedded switch 12, at least partly based on information received with the packet and optionally also partly based on information in one or more lookup tables, stores the number of copies by storing an attribute NumCopies with a packet written to a queue. When the packet is read from the queue, the NumCopies copies of the packet are transmitted.

Thus, by logical multicast, a packet is read multiple times. When such a packet is dequeued a reference counter for the number of copies may be decremented. However, it should be understood that a reference counter could be incremented for each copy until the maximum number of copies is reached. If the number of copies reaches a minimum number e.g. zero, or the maximum number, the packet is deallocated from the queue. Otherwise the packet is kept in the queue and dequeued repeatedly as selected by the corresponding scheduler. Logical multicast may support up to 64K copies per packet. It is suitable for a wide range of applications including Layer 3 multicast, i.e. ISO OSI Model layer three multicast; e.g. multicast of IP packets, and VPLS (Virtual Private LAN Service) flooding.

In embodiments, the embedded switch 12 comprises means for spatial multicast, whereby the embedded switch 12, at least partly based on information received with the packet and optionally also partly based on information in one or more lookup tables, selects at least two queues and writes a received packet to both selected queues.

Thus, by spatial multicast, a packet descriptor is written in parallel to multiple spatial multicast queues instead of regular queues, and a reference counter is initialised. For each spatial multicast queue a multicast copy is created and the reference counter is incremented or decremented. If the number of copies reaches a minimum number e.g. zero, or the maximum number, the packet is deallocated from the queue. These spatial multicast queues can be configured to shadow queues in the switch 12. This means that a spatial multicast queue is read instead of a queue as selected by the corresponding scheduler. Spatial multicast is suitable for low-latency multicast to physical ports, where multimedia distribution or Layer 2 multicast or broadcast are typical applications. Each spatial multicast queue can hold up to 64 packets of any packet size.

It should be understood that logical and spatial multicast can be combined. Numbers of copies can be up to 64K for packets written to the spatial multicast queues. This combination can be used for making copies for logical subports within a physical port.

In embodiments, the input arbiter 28 of the switch 12 is configured to serve interleaved packets from the input ports 26a of the switch 12 and to pass them on to the queue mapper 30 toward the packet buffer 24, cf. FIGS. 4a, 4b. Thus, the input arbiter 28 may be configured to buffer and schedule packet data from the one or more input ports 26 to the switch 12. Packet data 43a from the one or more input ports 26 are received by queues comprised in and served by the input arbiter 28. The input arbiter 28 is configured to interleave packet data 43a from different input ports 26a, writing one memory page at the time into the switch 12. Mechanism for overflow protection, such as backpressure 44a, 44b, tail drop or head drop, may be activated if the queues fill up.

In embodiments, the queue mapper 30 is configured to receive packet attributes 42a from the input arbiter 28. Packet attributes are sent with packets by one or more of the traffic interface 14, the optional packet formatter 32, the optional traffic manager 18 and/or the processing means 16. In other embodiments packet attributes may also be sent separately without sending packets. The queue mapper 30 is configured to decode the packet attributes and to generate a queue mapping from the packet attributes. The queue mapping comprises a queue number and optionally one or more multiple multicast queues where to write the packet, as well as what number of copies to make once the packet is dequeued. The queue mapping may also be used by a drop unit 34, which is configured to decide whether to drop or enqueue the packet.

In embodiments, at least one of the traffic interface 14, the processing means 16, the traffic manager 18 and the optional packet formatter 32 sets packet attributes based on processing of packet data and/or packet attributes received from the switch 12. This processing may be realized by execution of computer programs, by finite state machines or by classification using memory lookups such as lookup in content-addressable memory or RAM, or by other suitable means as understood by someone skilled in the art. In other embodiments the packet attributes are configured per port, per subport, per flow or per other logical unit within a port.

In one embodiment packet attributes 42a are an out-of-band signal on the input port 26a, i.e. the attributes are not sent through the same channel as the packets. In another embodiment packet attributes 42a are sent in-band and the switch 12, e.g. the queue mapper 30, is configured to fetch the packet attributes 43a from the packet data 43a. For example, the queue mapper 30 or the input arbiter 28 may be configured to fetch/retrieve attributes stored in a header and/or a trailer of the packet. The trailer may comprise supplemental data placed at the end of the packet.

The queue mapper 30 comprises a mapping database 31 configured to store information relating to the queue mapping.

The packet attributes may contain a direct or indirect queue mapping. In case of direct mapping, the packet attributes contain a queue mapping which is directly relayed to a drop unit for determination whether or not the packet data should be written, by the queue manager, to the queue corresponding to the direct queue mapping. In case of indirect queue mapping, the queue mapper 30 uses packet attributes 42a to look up the queue mapping from the mapping database 31, and then the packet attributes are relayed to the drop unit for determination whether or not the packet data should be written, by the queue manager, to the looked up queue. However, it should be understood that the attributes could be relayed to the drop unit for determination whether or not the packet should be dropped before directly or indirectly mapping the packet to a queue.

Further, the packet attributes may contain information related to packet drop, packet start, packet end, error, packet length, offsets to fields in the packet, source node, source port, source subport, source queue, destination node, destination port, destination subport, destination queue, class-of-service, color, mirroring, storage address, memory occupation, multicast state, data protection or other information that can be associated with a packet.

In embodiments, the switch 12 comprises means for discarding a received packet instead of writing it to a queue. The decision of discarding the packet is at least partly based on current queue length and/or average queue length and/or information stored in tables and/or information received with the packet.

The means for discarding a packet may be realized by a drop unit 34 as previously mentioned.

In embodiments, the switch 12 further comprises means for dropping a packet at the head of a queue instead of transmitting it to an output port. The decision of dropping the packet may at least partly be based on current queue length and/or average queue length and/or information store in tables and/or information received with the packet and/or the time spent by the packet in the queue.

The means for dropping a packet may be realized by a drop unit 34 configured to check, for each received packet, the conformance to rules for buffer reservation and active queue management and to make a pass or drop decision. The drop unit 34 may be configured to include means for weighted random early discard (WRED) and means tail drop for queues optionally sharing memory pools. The drop unit 34 may also comprise means configured to detect packet errors. The drop unit 34 may also maintain the queue lengths and contain configuration registers for backpressure generation.

By configuration in the drop unit 34, the packet buffer 24 may be divided into a number of areas of different types of memory usage. The drop unit 34 may be configured to supervise the use of these areas and to apply a set of mechanisms for packet drop or backpressure to protect buffer memory areas and prevent fatal buffer conditions.

In embodiments, the switch 12 may also comprise a queue manager 36 comprising an enqueue block configured to keep queue state and to manage linked lists for queues and free control memory. The enqueue block may further effectuate enqueuing of packets by appending packets and memory pages to the tails of linked lists as requested by the drop unit. The queue manager 26 may further comprise a dequeue block configured to effectuate dequeuing of packets by popping packets and memory pages from linked lists as requested by a packet scheduler 38.

In embodiments, the switch 12 comprises one or more internal sets of queues, the number of sets corresponding to the number of ports.

As schematically illustrated in FIG. 5a, in embodiments, the switch 12 comprises a queue set; PP queues, toward the processing means 16, a queue set; TX queues, toward the traffic interface 14 or the optional traffic manager 18, and a queue set; PF queues, to the optional traffic formatter 32. Each set of queues has a packet scheduler 38.

As schematically illustrated in FIG. 5b, in embodiments, the switch 12 comprises one set of queues; PP queues, toward the processing means 16, one set of queues; TX queues, toward the traffic interface 14, one set of queues; TM queues, toward the optional traffic manager 18, one set of queues; PF queues, to the optional packet formatter 32, and one set of queues; Drop queues, used for scheduling read operations for packet data to be dropped. Each set of queues has a packet scheduler 38, some of which is schematically illustrated in FIGS. 4a, 4b.

Further, as schematically illustrated in FIGS. 4a, 4b and 5a, 5b, the switch 12 comprises a packet scheduler 38 configured to schedule packets from the queues of the switch 12 to one or more functional blocks in communication with the switch 12, the scheduling being performed using a scheduling algorithm. The switch 12 may have at least one scheduler per output port which determines the order of service for the queues.

In embodiments, the packet scheduler 38 is configured to schedule the packets using one of or a combination of deficit weighted round robin (DWRR), strict priority queuing (SPQ), and round robin (RR). However, it should be understood that other suitable scheduling algorithms can be used. For example, the output port schedulers may serve queues according to at least one of the scheduling algorithms round-robin, weighted round-robin, deficit round-robin, deficit weighted round-robin, strict priority queuing, first-come first-serve, earliest deadline first, time-division multiplexing or another suitable scheduling algorithm.

In embodiments, the packet scheduler 38 may comprise one or more hierarchical schedulers comprising at least two levels of schedulers. For example, the packet scheduler 38 may comprise a processing means scheduler; PP scheduler, configured to schedule packet data to the processing means 16; a traffic manger scheduler; TM scheduler, configured to schedule packet data to the traffic manager; an interface scheduler; TX scheduler, configured to schedule packet data toward the traffic interfaces; TX interfaces, 14b; a packet formatting scheduler; PF scheduler configured to schedule packet data to the packet formatter 32, and/or a drop scheduler configured to schedule packet dropping.

The output port schedulers, e.g. TX scheduler, of the switch comprise traffic shapers, such as token buckets, leaky buckets or other suitable means or algorithms for realizing traffic shaping, which limit the data rate output from each scheduler.

The PP scheduler and the TX scheduler may be configured to serve 512 queues each, and the PF scheduler may be configured to serve 16 queues.

In embodiments, the switch may comprise an output arbiter 41, cf. FIGS. 4b and 5b. The output arbiter 41 may correspond to the input arbiter 28. The output arbiter 41 is configured to receive requests for packet read operations from the packet scheduler 38, and converts these operations to data read operations from the main packet buffer 24. The output arbiter 41 is configured to control the sharing of read bandwidth between output ports 26b. In embodiments, the output arbiter 41 is configured to schedule the packets using one of or a combination of deficit weighted round robin (DWRR), strict priority queuing (SPQ), and round robin (RR). However, it should be understood that other suitable scheduling algorithms can be used. For example, the output port schedulers may serve queues according to at least one of the scheduling algorithms round-robin, weighted round-robin, deficit round-robin, deficit weighted round-robin, strict priority queuing, first-come first-serve, earliest deadline first, time-division multiplexing or another suitable scheduling algorithm. In embodiments, at least one output port has subports. In this case the output arbiter 41 further schedules these subports and controls the bandwidth sharing between the subports of the output port.

Embodiments of the switch 12 comprise a status formatter 40 arranged in communication with the packet buffer 24 and the packet scheduler 38, and configured to generate backpressure to the packet scheduler when the levels of queues exceed configured watermarks. By virtue of a configurable connection matrix the backpressure signals can be mapped flexibly to queues or nodes in the packet scheduler.

As illustrated in FIGS. 5a, 5b, scheduling can be on/off regulated by backpressure from the processing means 16, the packet formatter 32, the traffic interfaces 14, or the traffic manager 18. In other words, the scheduling of packet data to the processing means 16, the packet formatter 32, the traffic interfaces 14, or the traffic manager 18 can be interrupted if the buffers of them are full and incapable of receiving any more packet data. The packet scheduler 38 halts the scheduling and sending of packet data until the buffers have been emptied and are once more capable of receiving packet data.

The following examples describe the processing of four exemplifying packets by the network processor. These and other packets may be processed concurrently with the same configuration of the network processor. Thus, one and the same network processor configuration can result in different flow paths through the network processor.

All four packets 43a initially take the same path. They are received by a traffic interface 14. By configuration of the traffic interface 14, the packet attributes 42a are set to a direct mapping to a PP queue toward the processing means 16. Unless the packet is dropped by the drop unit 34 the packet is enqueued in the selected PP queue and its packet data is stored in the data storage 24-1 of the main packet buffer 24. From this PP queue the packet is scheduled by the packet scheduler 38 and parts or all of the packet data is read from the main packet buffer 24 by the output arbiter 41 and sent to the processing means 16 via the PP port 26b. The packet attributes are set by the switch 12 based on the queue number. The processing means 16 processes the packet by means of a computer program executing program code sequences, which may perform classification and editing of packet data and/or packet attributes as well as other manipulation of packet information and databases as known to someone skilled in the art. The processing means 16 inspects packet content such as packet header and performs table lookup. Based on these operations the four packets are treated in four different ways, which will be described under the points 1)-4) below.

1) The processing means 16 identifies the first exemplifying packet as a user packet which shall pass through the switch 12, the traffic manager 18, and again through the switch 12 before it is sent to the traffic interfaces 14. To achieve this, the processing means 16 adds a header holding input parameters to the traffic manager 18 to the packet and sets packet attributes to a direct mapping to a queue toward the traffic manager 18. After the packet has passed via the switch 12, as described above, the traffic manager 18 uses parameters in the input header to set a direct mapping to a queue toward the traffic interfaces 14. After another pass through the switch 12 to the traffic interfaces 14, the packet is transmitted to an external receiver (not shown).

2) The processing means 16 identifies the second exemplifying packet as a low-latency control packet which shall pass through the switch 12 directly to the traffic interfaces 14. To achieve this, the processing means 16 sets packet attributes to a direct mapping to a queue toward the traffic interfaces 14. After another pass through the switch 12 to the traffic interfaces 14, the packet is transmitted to an external receiver (not shown).

3) The processing means 16 identifies the third exemplifying packet as a multicast packet, for example a multicast video packet. This packet shall be copied to multiple instances and sent to different ports of the traffic interfaces 14.

To achieve this, the programmable pipeline 16 sets packet attributes to an indirect mapping identifying a multicast group. However, it should be understood that a direct mapping to a multicast queue is also possible, but since many multicast queue exists it is resource demanding to provide a direct mapping, and thus, in order to save band width, it is preferred to provide an indirect mapping. The queue mapper 30 uses the multicast group as key for lookup in a mapping database 31. This lookup returns a list of multicast queues where to enqueue the packet. Unless a copy is discarded by the drop unit 34 each copy is written to a multicast queue. After passing through the switch 12 to the traffic interfaces 14 each packet is transmitted to an external receiver (not shown).

4) The processing means 16 identifies the fourth exemplifying packet as a user packet which shall be fragmented, for example by IPv4 fragmentation. This packet shall pass through the switch 12, the packet formatter 32, once again through the switch 12, the traffic manager 18, and a last time through the switch 12 before it is sent to the traffic interfaces 14 for transmission. To achieve this, the processing means 16 adds a header for input parameters to the packet formatter 32 and sets packet attributes to a direct mapping to a queue toward the traffic manager 18. After the packet has passed via the switch 12 as described above, the packet formatter 32 uses configuration parameters or parameters in the input header to control the functions and/or operations to be performed. Further, the packet formatter 32 sets a direct mapping to a queue back to the processing means 16. From here on, the same procedure steps as from the processing means 16 for the first exemplifying packet are taken.

Although, the present invention has been described in accordance with the embodiments shown, one of ordinary skill in the art will readily recognize that there could be variations made without departing from the scope of the invention. Accordingly, it is intended that all matter contained in the above description and shown in the accompanying drawings shall be interpreted as illustrative and not in a limiting sense.

The invention claimed is:

1. A network processor unit for processing packets, the network processor unit comprising:
    an interface configured to receive and transmit packets;
    at least one processor for processing packets or parts of the packets;
    a switch configured to switch packets between the interface and the at least one processor;
    a traffic manager configured to communicate with the interface and the switch; and
    a buffer included in the switch, the buffer configured to be commonly shared at least between the interface, the at least one processor, and the traffic manager, wherein a packet burst only occurs at most once at a time in the switch.

2. The network processor unit according to claim 1, wherein the switch is further configured to analyze a received packet in the packet burst and determine whether the packet should be dropped or not.

3. The network processor unit according to claim 2, wherein the switch is further configured to store the received packet when the packet should not be dropped and send a first part of the packet to the at least one processor for processing of the packet.

4. The network processor unit according to claim 3, wherein the switch is further configured to receive the processed first part of the packet from the at least one processor and transmit the processed first part of the packet.

5. The network processor unit according to claim 1, wherein the switch is configured to store a second part of the packet, receive the processed first part of the packet from the least one processor, and reassemble the processed first part of the packet and the second part of the packet before transmitting the reassembled packet.

6. The network processor unit according to claim 5, wherein the buffer stores the second part while the first part being processed, the first part being a head of the packet, the second part being a body of the packet.

7. The network processor unit according to claim 1, wherein the interface, the at least one processor, the traffic manager, or a packet formatter arranged in communication with the switch is configured to set packet attributes based on the processing of the packets.

8. The network processor unit according to claim 7, wherein the switch, based on the set packet attributes, determines a functional block and sends the packet to the functional block that is one of the interface, the at least one processor, the traffic manager, and the packet formatter.

9. The network processor unit according to claim 1, wherein the interface, the at least one processor, the traffic manager, or a packet formatter arranged in communication with the switch is configured to set packet attributes based on information received from the switch.

10. The network processor unit according to claim 1, wherein the switch is further configured with input/output ports from/to the interface and the at least one processor, whereby a packet received on one of the input ports is queued to a queue of the output ports and transmitted via the queue based on packet attributes of the packet.

11. A method of a network processor unit for processing packets, the method comprises:
    receiving and transmitting packets by an interface;
    processing packets or parts of the packets by at least one processor;
    switch packets between the interface and the at least one processor by a switch;
    communicating with the interface and the switch by a traffic manager; and
    commonly sharing a buffer of the switch at least between the interface, the at least one processor, and the traffic manager, wherein a packet burst only occurs at most once at a time in the switch.

12. The method according to claim 11, further comprising:
    analyzing a received packet in the packet burst; and
    determining whether the packet should be dropped or not.

13. The method according to claim 12, further comprising:
    storing the received packet when the packet should not be dropped; and
    sending a first part of the packet to the at least one processor for processing of the packet.

14. The method according to claim 13, further comprising:
    receiving the processed first part of the packet from the at least one processor; and
    transmitting the processed first part of the packet.

15. The method according to claim 1, further comprising:
    storing a second part of the packet;
    receiving the processed first part of the packet from the least one processor; and
    reassembling the processed first part of the packet and the second part of the packet before transmitting the reassembled packet.

16. The method according to claim 15, further comprising:
    storing the second part in the buffer while the first part being processed, the first part being a head of the packet, the second part being a body of the packet.

17. The method according to claim 11, further comprising:
setting packet attributes based on the processing of the packets the interface by the at least one processor, the traffic manager, or a packet formatter arranged in communication with the switch.

18. The method according to claim 17, further comprising:
determining a functional block based on the set packet attributes; and
sending the packet to the functional block that is one of the interface, the at least one processor, the traffic manager, and the packet formatter.

19. The method according to claim 11, further comprising:
setting packet attributes based on information received from the switch by the interface, the at least one processor, the traffic manager, or a packet formatter arranged in communication with the switch.

20. The method according to claim 11, further comprising:
inputting/outputting a packet from/to the interface and the at least one processor; and
queuing a packet received on one of input ports of the switch to a queue of output ports of the switch and transmitted via the queue based on packet attributes of the packet.

* * * * *